(12) United States Patent
Wang et al.

(10) Patent No.: US 8,572,679 B1
(45) Date of Patent: Oct. 29, 2013

(54) AUTOMATIC SYSTEM UPGRADE ORCHESTRATOR

(75) Inventors: Ruiyi Wang, Redmond, WA (US); Jaskaran Singh, Redmond, WA (US); Vinod Kumar, Bothell, WA (US); Shane Brady, Seattle, WA (US); Ann Williams, Kirkland, WA (US); Alexander MacLeod, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/556,785

(22) Filed: Jul. 24, 2012

(51) Int. Cl.
*G06F 17/00* (2006.01)

(52) U.S. Cl.
USPC ........ 726/1; 726/3; 726/4; 709/217; 709/218; 709/223; 717/175; 713/175; 713/191; 370/401; 370/328; 370/389

(58) Field of Classification Search
USPC .................... 726/1, 3, 4; 709/217, 218, 223; 713/175, 191; 717/175
See application file for complete search history.

(56) References Cited

U.S. PATENT DOCUMENTS

| 7,392,391 | B2 * | 6/2008 | Eibach et al. | 713/175 |
| 2003/0084350 | A1 * | 5/2003 | Eibach et al. | 713/201 |
| 2005/0190764 | A1 * | 9/2005 | Shell et al. | 370/389 |
| 2006/0193321 | A1 * | 8/2006 | Shell et al. | 370/389 |
| 2011/0264768 | A1 * | 10/2011 | Walker et al. | 709/218 |

OTHER PUBLICATIONS

Mulazzani, et al., "Dark Clouds on the Horizon: Using Cloud Storage as Attack Vector and Online Slack Space", Retrieved at <<http://static.usenix.org/event/sec11/tech/full_papers/Mulazzani.pdf>> Proceedings: In Proc. of the 20th USENIX Security, San Francisco, California, USA, Aug. 2011, pp. 11.
Xianqiang, et al., "SyncViews: Toward Consistent User Views in Cloud-based File Synchronization Services", Retrieved at <<http://ieeexplore.ieee.org/stamp/stamp.jsp?tp=&arnumber=6051738>> Proceedings: 2011 Sixth Annual ChinaGrid Conference, Aug. 2011, pp. 89-96.
Pinola, Melanie, "Dropbox vs. the Alternatives: Which Online Syncing Service is Right for You?", Retrieved at <<http://lifehacker.com/5818908/dropbox-vs-the-alternatives-which-online-syncing-service-is-right-for-you>> Jul. 7, 2011, pp. 7.

(Continued)

*Primary Examiner* — Beemnet Dada
*Assistant Examiner* — Sayed Beheshti Shirazi
(74) *Attorney, Agent, or Firm* — Turk IP Law, LLC (57) ABSTRACT

A system is provided for employing an orchestrator to deploy and implement changes to a system. A change request may be a system build, upgrade, and patches for updating a subset of files within the system. The orchestrator may initially perform a security check and a validation check on a received change request. Upon receiving validation and approval, the change request may be deployed and propagated through a series of deployment scopes. The deployment scopes may become increasingly larger to extensively test the applied change before fully implementing the change on the target system. The orchestrator may submit the applied change to a validation component for getting validation of the change within the deployment scope after each applied change within a deployment scope. After the change request has been deployed through the deployment scopes and validated, the change request may be deployed to the target system and fully implemented.

16 Claims, 11 Drawing Sheets

(56) References Cited

OTHER PUBLICATIONS

Purl, Tom, "Making Sensitive Data Ubiquitous With Dropbox and TrueCrypt", Retrieved at <<http://tompurl.com/2011/03/25/making-sensitive-data-ubiquitous-with-dropbox-and-truecrypt/>> Mar. 25, 2011, pp. 6.

Bacon, et al., "Big Ideas Paper: Enforcing End-to-end Application Security in the Cloud", Retrieved at <<http://www.cl.cam.ac.uk/~de239/mw10-cloud_security.pdf>> Proceedings: CIKM'10, Retrieved Date: Feb. 27, 2012, pp. 20.

"Xythos on Demand Online Document Management and Collaboration", Retrieved at <<http://www.xythos.com/_media_xod/xythosondemand_datasheet.pdf>> Retrieved Date: Feb. 27, 2012, pp. 5.

Schnofeld, Erick, "ShareFile Introduces Cloud-Based File Syncing for the Enterprise", Retrieved at <<http://techcrunch.com/2011/01/18/sharefile-sync/>> Jan. 18, 2011, pp. 4.

"Instance-Based Command Execution, Approval, and Notification Framework", U.S. Appl. No. 13/154,660, filed Jun. 7, 2011, pp. 25.

\* cited by examiner

Define your deployment

| | |
|---|---|
| Deployment Name | PAVC Alert - 20111109-2 — 502 |
| Type | Security Patch |
| Select Patches | MS11-083 — 504 |
| Deploy change to | All — 506 |
| Urgency | High |
| Pause Other Deployments | ✓ |
| Risk level of your change | Medium — 508 |
| | Scope: Server, Servers, Forest, Service Fuse Wait Time: 30 minutes |
| Approver | Datacenter SWAT — 510 |
| Component Fuseset | Security Patch |
| | In addition to general health fuse |

Submit    Cancel

Deployment Options

Select Patch

Browse a list of patches... — 802

Deploy change to
Site

Apply to roles
CAS

Risk level of your change
Medium

Component Fuseset in addition to general health check
Provisioning

Wait time for fuse
30 minutes

SN2

Submit   Cancel

AUTOMATIC SYSTEM UPGRADE ORCHESTRATOR

BACKGROUND

Large scale systems and services, such as an enterprise management application for example, may need constant changes and updates to bring the system up to date and to troubleshoot bugs and other security and coding issues. Example changes and updates to the system may include full software builds, configuration file patches, partial upgrades, and binary and other file patches.

Typically, there may be a lot of software involved in delivering and implementing changes to a system, which can make changing and updating large scale systems, complicated, arduous and time consuming. Often times multiple system changes are submitted simultaneously by multiple users and it can be difficult to manage and coordinate the change across the system involving multiple sites, servers, and users. Additionally when implementing changes and upgrades to a system, validation and security issues may also make it difficult to coordinate and manage the changes. Further large scale system updates and changes may need manual implementation by software engineers, which can add to the difficulty and time to implement the changes.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system for employing an orchestrator to deploy and implement changes to a system. The orchestrator may be configured to receive one or more submitted change requests and may manage and coordinate deployment of the change request to implement the changes to a target system. The orchestrator may initially perform a security check and a validation check at a validation component on a received change request, and upon receiving validation and approval, the change request may be deployed and propagated through a series of progressively larger deployment scopes. After the change request has been deployed through the series of deployment scopes and sufficiently validated, the change request may be deployed to the target system and fully implemented.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 8 illustrates a deployment user interface for initiating a deployment request to an orchestrator, according to embodiments;

DETAILED DESCRIPTION

As briefly described above a system is provided for employing an orchestrator to deploy and implement changes to a system. One or more change requests may be submitted to an orchestrator component which may be configured to manage and coordinate the change requests to deploy and implement the changes to a target system. A change request may be a full system build, a system upgrades, and various system and site patches for updating a subset of files within the system. The orchestrator may initially perform a security check at a security component and a validation check at a validation component on a received change request. Upon receiving validation and approval, the change request may be deployed and propagated through a series of progressively larger deployment scopes. The orchestrator may also submit the applied change to the validation component for getting validation of the change within the deployment scope after each applied change within a deployment scope and before proceeding with deployment to a next deployment scope. After the change request has been deployed through the series of deployment scopes and sufficiently validated, the change request may be deployed to the target system and fully implemented.

The following detailed description is therefore not to be taken in a limiting sense, and the scope of the present invention is defined by the appended claims and their equivalents.

While the embodiments will be described in the general context of program modules that execute in conjunction with an application program that runs on an operating system on a server or similar computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for employing an orchestrator to deploy and implement changes to a system. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
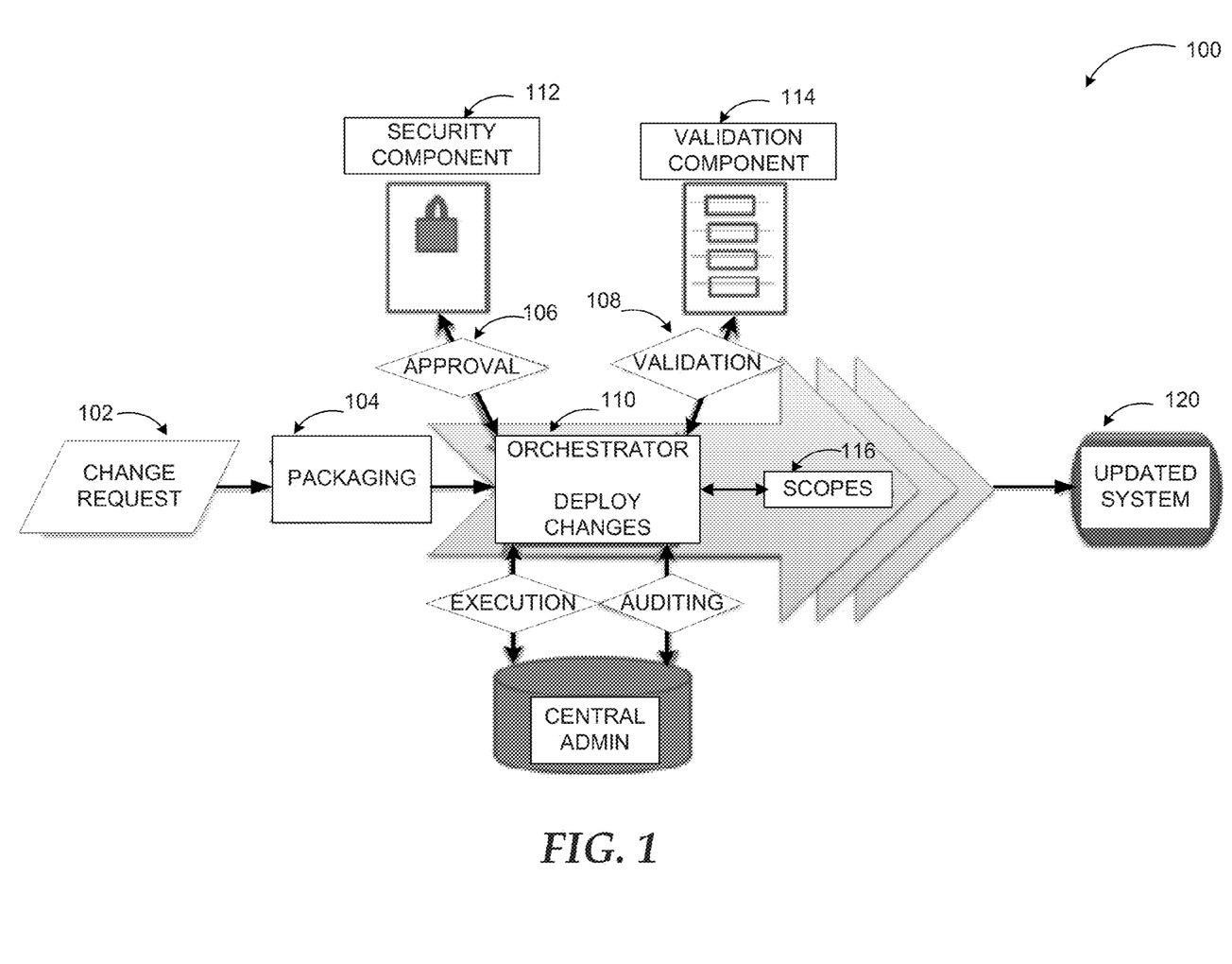
FIG. 1 illustrates an example update orchestrator workflow for implementing changes to a system, according to embodiments.

FIG. 1 illustrates an example update orchestrator for implementing changes to a system, according to embodiments. Large scale systems and services, such as an enterprise management application for example, may need constant changes and updates. Example changes and updates to the system may include full software builds, configuration file patches, partial upgrades, and binary and other file patches. Typically, when implementing changes and updates to a large scale system, there may be a lot of software involved in making the changes, which can make changing and updating large scale systems, complicated, arduous and time consuming. Multiple system changes may be submitted concurrently and it can be difficult to manage and coordinate the change across the system involving multiple sites, servers, and users. When implementing changes and upgrades to a system, validation and security issues may also make it difficult to coordinate and manage the changes. Additionally, large scale system updates and changes may be submitted by multiple contributors and may necessitate manual implementation by software engineers, which can add to the difficulty and time to implement the changes.

A system according to embodiments may employ an update orchestrator for automatically deploying and implementing changes to a system regularly and safely. The orchestrator may receive multiple change requests for parts of the system, and once the change requests are received, the orchestrator may verify and validate the change requests, perform a security check and deploy the changes and implement the changes to the system progressively. The orchestrator may be configured to manage multiple changes concurrently, and may coordinate the deployment of the change requests based on identified priorities and dependencies of the changes within the system.

Diagram 100 demonstrates an example workflow for receiving change requests and deploying the change requests to implement the changes to the system. One or more change requests may be submitted to the orchestrator as full build upgrades and as patches for updating a subset of files within the system and not needing a full system uninstall and reinstall. The change requests may be submitted frequently and continuously, and the orchestrator may be configured to continuously receive the change requests, coordinate the change requests, and implement the change requests to the system in a continuous upgrade cycle. Change requests may be submitted to the orchestrator by users associated with the system, and additionally change requests may be automated and provided by a service data center associated with the system. The orchestrator may be configured to detect the submission of a change request from human and automated sources, and may receive the change request. A change request agent within the orchestrator may be responsible for receiving the initial change request submission.

In an example embodiment, the change requests may initially be packaged such that the change request includes the information for successfully implementing the change requests to the system. Example packaging may include data to be implemented or the payload, data configuration files, and data scripts. The payload may include the data for implementing the changes to the system. The data configuration files may include information regarding the target destination system of the payload, target scopes associated with the target destination system, and information about the time for the implemented changes to take effect on the system. The data scripts may define custom steps and functions which need to be executed during the deployment process, and may also include validation steps.

In a system according to embodiments, once the orchestrator 110 receives the submitted change requests 102, the orchestrator 110 may employ a multitude of steps for approving, validating, deploying and implementing the change requests to the system. The deployment process at the orchestrator may initially be triggered upon the availability and submission of the change requests. Before a change can be fully implemented in the system, the change request may be associated with approval 106 and validation 108. When a change request is initially submitted to the orchestrator, the orchestrator may first perform a security check at a security component 112. The security component 112 may be responsible for verifying licenses and certificates associated with the submitted change request for the system, and for ensuring that deployment of the change request is within policy and/or request approval. If the change request receives approval 106 at the security component 112, the orchestrator 110 may initiate the deployment process to apply the changes to the system.

In an example embodiment, the change request 102 may be deployed and propagated through a series of deployment scopes 116. The deployment scopes 116 may become increasingly larger in order to test the applied change at a number of stages before fully implementing the change on the target system. At initial deployment through a first deployment scope, and at every deployment scope advancement, the orchestrator 110 may submit the applied change to a validation component 114 for validating the change request. At the initial deployment to a first deployment scope the validation component 114 may ensure that the site is in a stable enough state for the deployment to begin. If the change request receives validation, the orchestrator 110 may proceed with initial deployment to the first deployment scope.

Additionally, after the change has been applied within the first deployment scope, the orchestrator may submit the applied change to the validation component 114 for getting validation 108 of the change. The validation component 114 may evaluate the quality of the applied change, and may ensure that the applied change meets specifications for the system and fulfills its intended purpose. If the applied change is validated, then the orchestrator may proceed with deploying the change to the next deployment scope. The validation component 114 may be employed after each applied change within a deployment scope. If the validation component 114 determines a failure, according to a predefined percentage of success, then the orchestrator 110 may not proceed with deploying the next scope. The validation component 114 may be configured to provide results of the deployment to the orchestrator 110. The orchestrator 110 may provide the results to users for enabling troubleshooting. For example, at a certain percent failure or at completion, the orchestrator 110 may email the results as a list of failures and successes so that a user may receive a summary of the results of the deployment, and may troubleshoot failures if necessary.

In an example embodiment, the orchestrator may also be configured to preview the goal or final changed state of the system based on the submitted change requests, and can then identify if any change requests are missing. If any change requests are missing, the orchestrator may access a service data center to retrieve missing change requests in order to deploy the changes and return the system to the final changed state. The orchestrator may also be configured to identify payload profiles, such that when a change request is submitted, the orchestrator may identify the payload profile and the risk level of the change request in order to efficiently select the scopes, approvals, validations 108 and processing time based on the identified payload profile.

Figure 2:
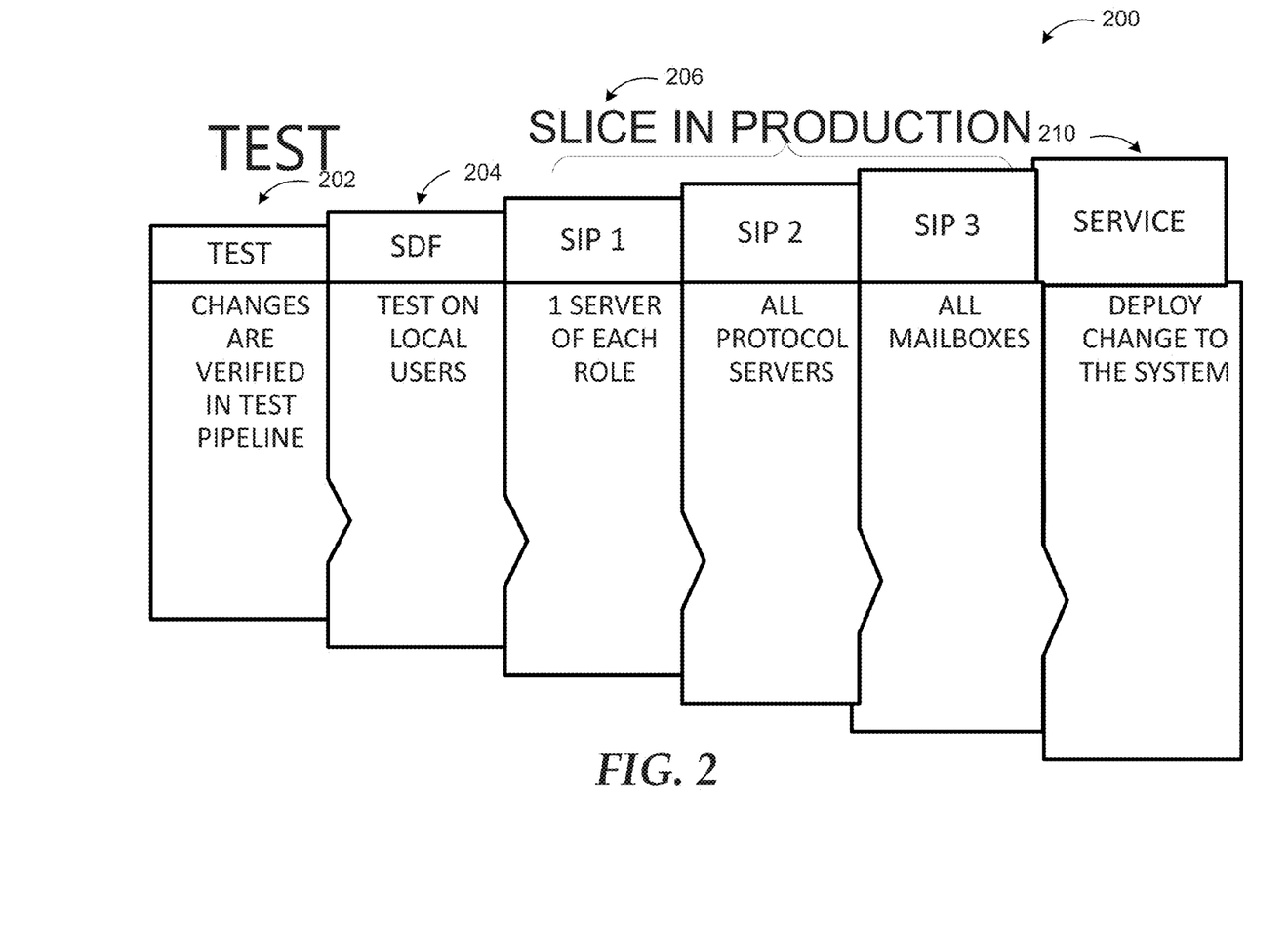
FIG. 2 illustrates deployment scopes of a workflow for implementing changes to a system, according to embodiments.

FIG. 2 illustrates deployment scopes of a workflow for implementing changes to a system, according to embodiments. As briefly described above, in an example embodiment, the change request may be deployed and propagated through a series of deployment scopes. The deployment scopes may become increasingly larger in order to extensively test the applied change at a number of stages before fully implementing the change on the target system. At an initial deployment scope, the change request is verified while in the initial stages 202. If validated by the validation component, then the orchestrator may proceed with deploying the change request through the next deployment scope.

The next deployment scope may be an SDF (an internal server) deployment scope 204 in which the change request is applied on local users, or in house of the target system. After the change request is applied in the SDF deployment scope 204, the orchestrator may submit the applied change to the validation component, and if validated by the validation component, then the orchestrator may proceed with deploying the change request through the next deployment scope. Following the SDF deployment scope 204, the change request may be submitted to a series of SIP (Slice In Production) deployment scopes 206. Within a first SIP deployment scope, SIP 1, the change request may be applied to one type of server in each role, for example, a CAS server, a UM server and a HUB server.

If the applied change receives validation at the validation component, the change request may be applied within a second SIP deployment scope, SIP 2, where the change request may be applied to protocol servers. In an example scenario, the protocol servers may be tested in groups, such that only a small percentage of the servers are tested at a time. For example, the change request may be applied to 20% of the protocol servers at a time for a total of 5 groups or waves. If the applied change receives validation at the validation component, the change request may be applied within a third SIP deployment scope, SIP 3, where the change request may be applied to mailbox servers associated with the protocol servers. As with SIP 2, the mailbox servers may be tested in groups, such that the change request may be applied to one group at a time. If the applied change to SIP 3 receives validation at the validation component, the change request may be applied to the target system for globally implementing the changes to the system, and ultimately, the end users of the system 210.

Figure 3:
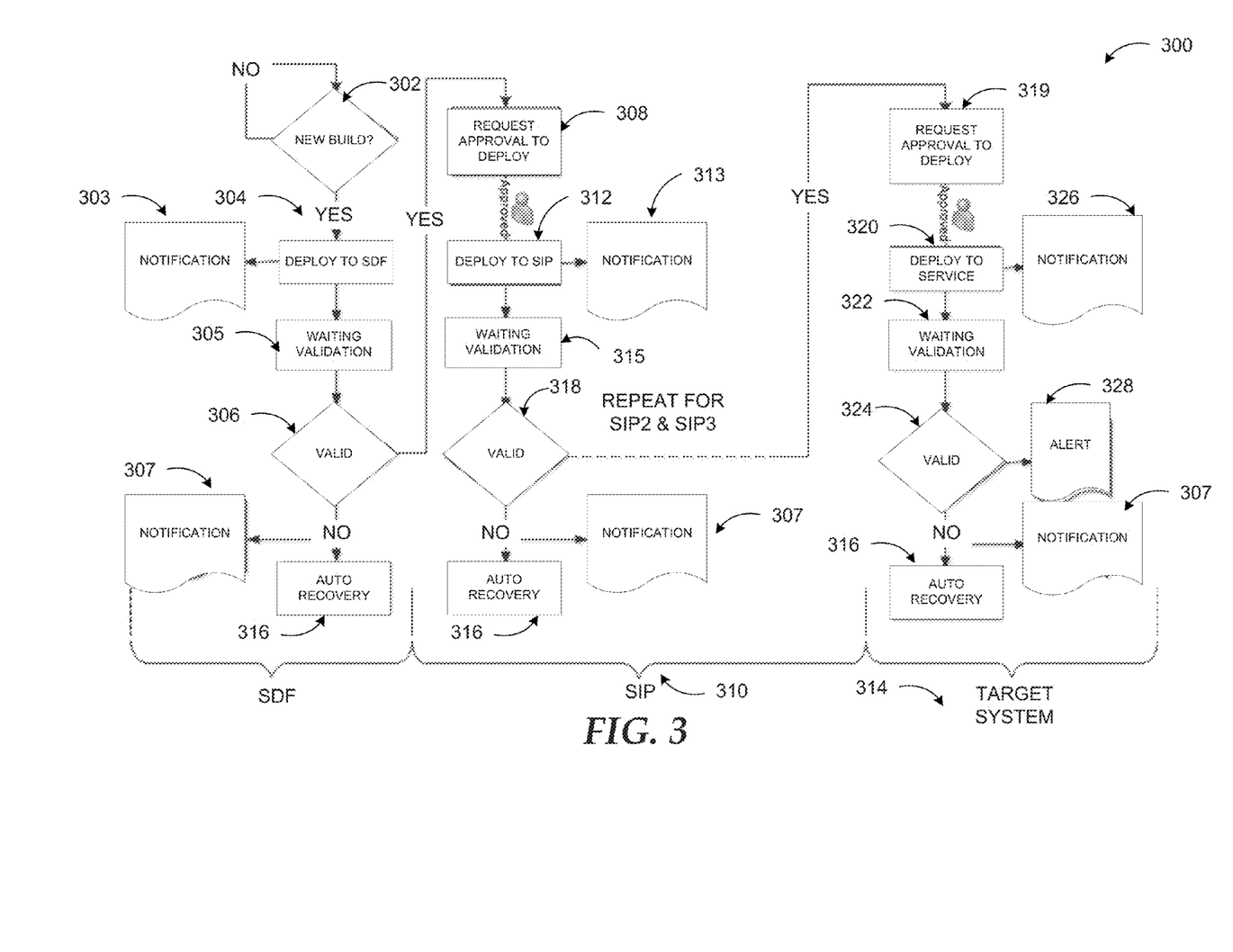
FIG. 3 illustrates and example orchestrator workflow for implementing a full system build to a system, according to embodiments.

FIG. 3 illustrates and example orchestrator workflow for implementing a full system build to a system, according to embodiments. In a system according to embodiments, deployment by the orchestrator may be triggered upon detection of a change request 300, which may include a full system build, system upgrade, and/or partial system patches. Upon submission and receipt of a new build 302, the orchestrator may initially perform the validation and approval steps as previously discussed. Once the new build 302 request receives validation and approval, the orchestrator may deploy the new build request through the series of deployment scopes. A first deployment scope may be the SDF deployment scope 304 where the new build is applied and tested internally on local users. After applying the new build within the SDF deployment scope 304, the results of the new build may be returned to the validation component 305 for evaluating the results and determining the success of the new build within the SDF scope. Upon deployment to the SDF deployment scope 304, the orchestrator may provide notification 303 of a successful deployment.

If the new build results are returned as valid 306, the orchestrator may proceed with the deployment process, and the orchestrator may deploy the new build to the SIP series 310 of deployment scopes, which may include SIP 1, SIP 2, and SIP 3, as discussed previously. The orchestrator may repeat a similar process as with the SDF deployment scope, where the orchestrator may request approval to deploy 308 and the new build may be deployed 312 to the SIP 1 deployment scope first, where the new build is applied and tested on one type of server in each role. Upon deployment to the SIP 1 deployment scope, the orchestrator may provide notification 313 of a successful deployment.

The results of the SIP 1 deployment may then sent to the validation component to await validation 315. If the validation component approves 318 the build in the SIP1 deployment scope, the deployment process may be repeated with the SIP 2 deployment scope, where the new build may be applied and tested on the protocol servers, and similarly on SIP 3, where the new build may be applied and tested on mailbox servers associated with the protocol servers. If the validation component approves the SIP series of deployment scopes, then the orchestrator may approval to deploy 319 to the target system, and the new build may be deployed 320 to the target system. After the new build has been applied to the target system, the orchestrator may provide notification 326 of a successful deployment, and may send the results of the deployment to the validation component to await validation 322. The validation component may again evaluate the results of the new build at the target system, and if approved as valid 324, then the system may be upgraded with the new build. The orchestrator may provide an alert 328 of successful and valid deployment to the target system 314.

In an example embodiment, if the validation component does not validate the results after any of the deployment scopes within the series of deployment scopes, the orchestrator may perform an auto-recovery 316 and may generate an alert 307 for enabling users to troubleshoot the failure. An auto-recovery 316 may be generated from a backup copy of the files maintained on the target system. If auto-recovery is needed, then the system may be recovered with the backup copy of the files from the target system locally instead of from the orchestrator. If no auto-recovery is needed, then the deployment process may continue implementing the data in the change request.

Figure 4:
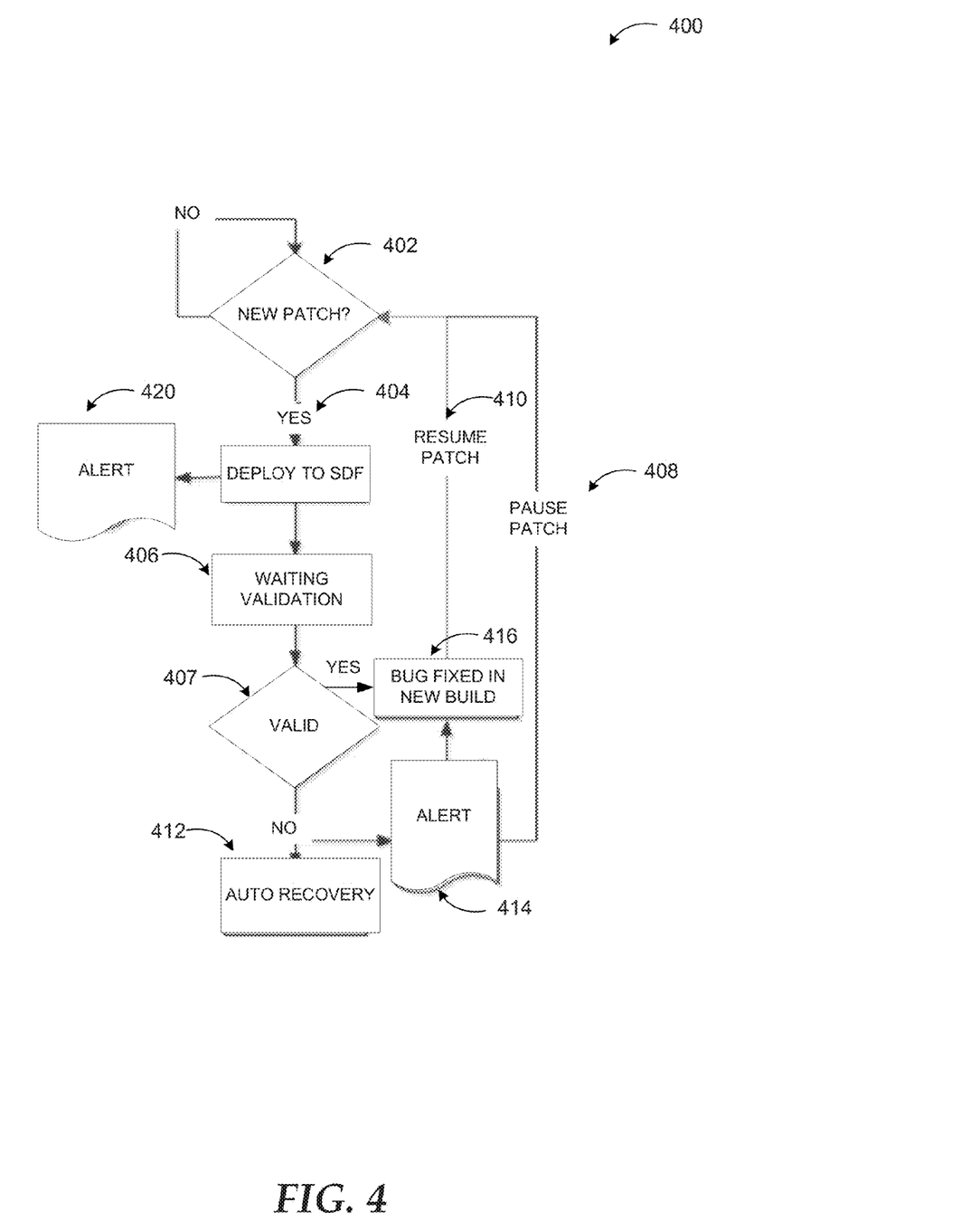
FIG. 4 illustrates and example orchestrator workflow for implementing a patch to a system, according to embodiments.

FIG. 4 illustrates and example orchestrator workflow for implementing a patch to a system, according to embodiments. In a system according to embodiments, deployment by the orchestrator may be triggered upon detection of a change request, which may include a request to perform partial system patch 402. A patch may be used to update only a subset of the files so that the system does not need a complete uninstall and reinstall. The orchestrator's deployment of a patch may follow similar steps as with deployment of a full system build as described in conjunction with FIG. 3.

In an example embodiment, upon submission and receipt of a patch 402, the orchestrator may initially perform the validation and approval steps as previously discussed. The validation component may initially run validation steps to make sure the patch is compatible with the system versions being patched. Once the patch request is reviewed and approved, the orchestrator workflow for deploying the patch request may be initiated through deployment scopes. The patch may be deployed to the SDF deployment scope 404 where the new build may be applied and tested internally on local users.

In an additional embodiment, the deployment scopes for applying a patch may be divided into scope subsets which may include, for example, a target service, a site, and a batch of machines within the target service. The batch of machines may be a set of heterogeneous machines with build versions and machine definitions for ensuring the patch is tested thoroughly on a variety of servers and machine types before moving on. Further when patching with heavy payloads, which may be associated with taking a machine or server out of service, the orchestrator may optimize the process by applying the patch to batches or subset groups of machines or servers separately within the deployment scope so as not take the whole machine out of service.

After applying the new build within the deployment scope, the results of the new build may be returned to the validation component 406 for evaluating the results and determining the success of the new build within the SDF scope. If the deployment is determined to be valid 407, then the patch may fix the issue in the build 416 and the patching may resume 410. If failures are identified, then the orchestrator may pause 408 the patching and perform an auto-recovery 412. The orchestrator may also generate an alert 414 for enabling users to be notified of the failures and to troubleshoot the failure.

Figure 5:
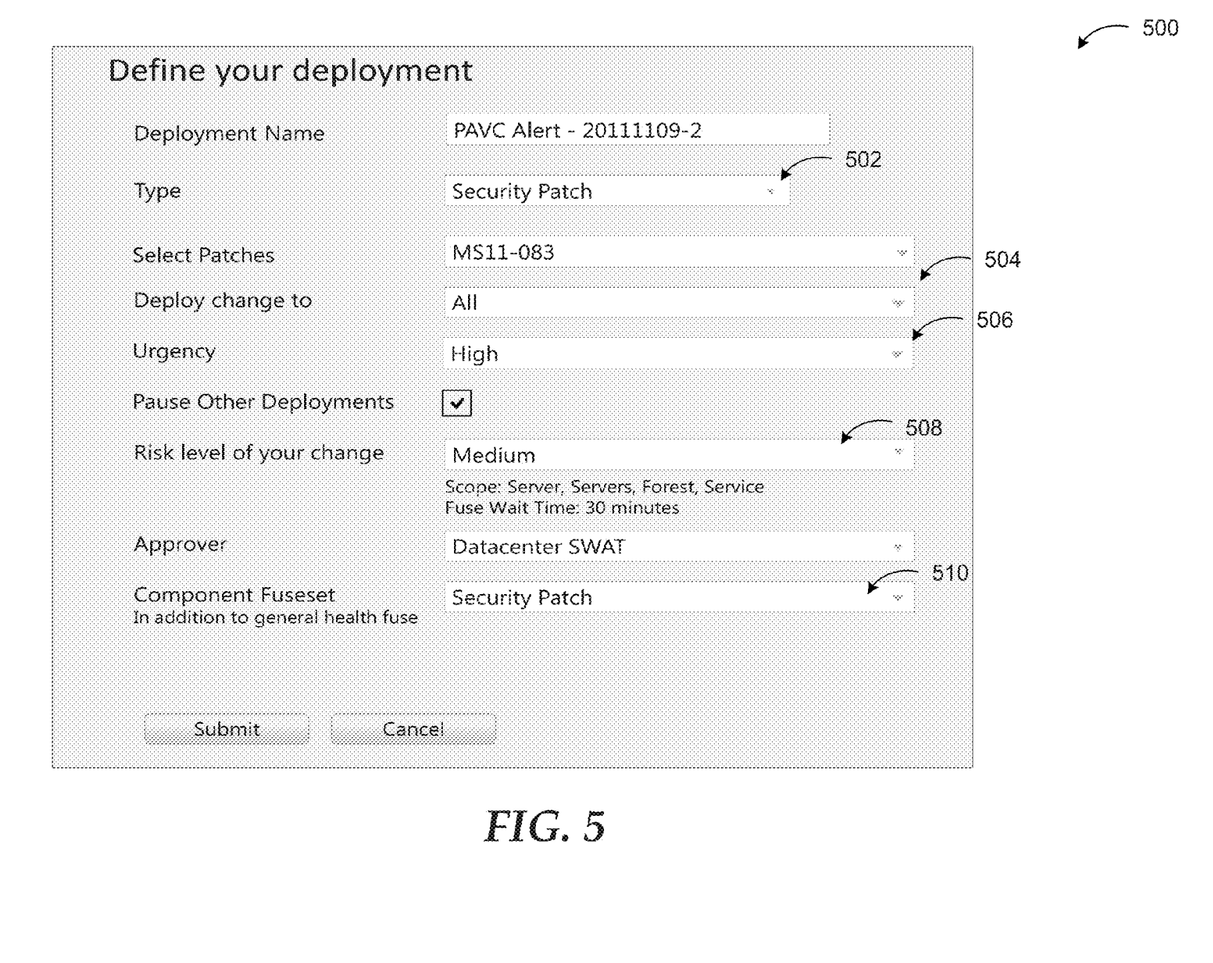
FIG. 5 illustrates an example user interface for interacting with the orchestrator component, according to embodiments.

FIG. 5 illustrates an example user interface for interacting with the orchestrator component, according to embodiments. One or more users may submit a change request and patches for upgrading a system to an orchestrator component for automatically deploying and implementing the upgrade to the system. In an example user interface as demonstrated in diagram 500, the user, or an administrator, may be able to submit a change request to the orchestrator using a form for providing additional information about the change request. For example, the administrator may be able to provide information such as a type of change request 502, including a patch, upgrade, and new build, as some examples.

The user interface may also include further options for enabling the user to select the target system 504 or systems to which the changes are to be applied, the urgency 506 of the change request, and the risk level 508 of the change request. In an example scenario, selecting high urgency may cause the normal urgency changes to be paused and the high urgency change request to be deployed with higher priority. A risk level of the change request may be, for example, high, medium, or low, and the selected risk level may provide information to the orchestrator about the servers involved in the change request, the processing time for the change request to be fully implemented, and the time by the validation component to validate the change request, as some examples. The user may also be able to define validation criteria 510 which the validation component may follow to validate the change request at a number of validation points.

Figure 6:
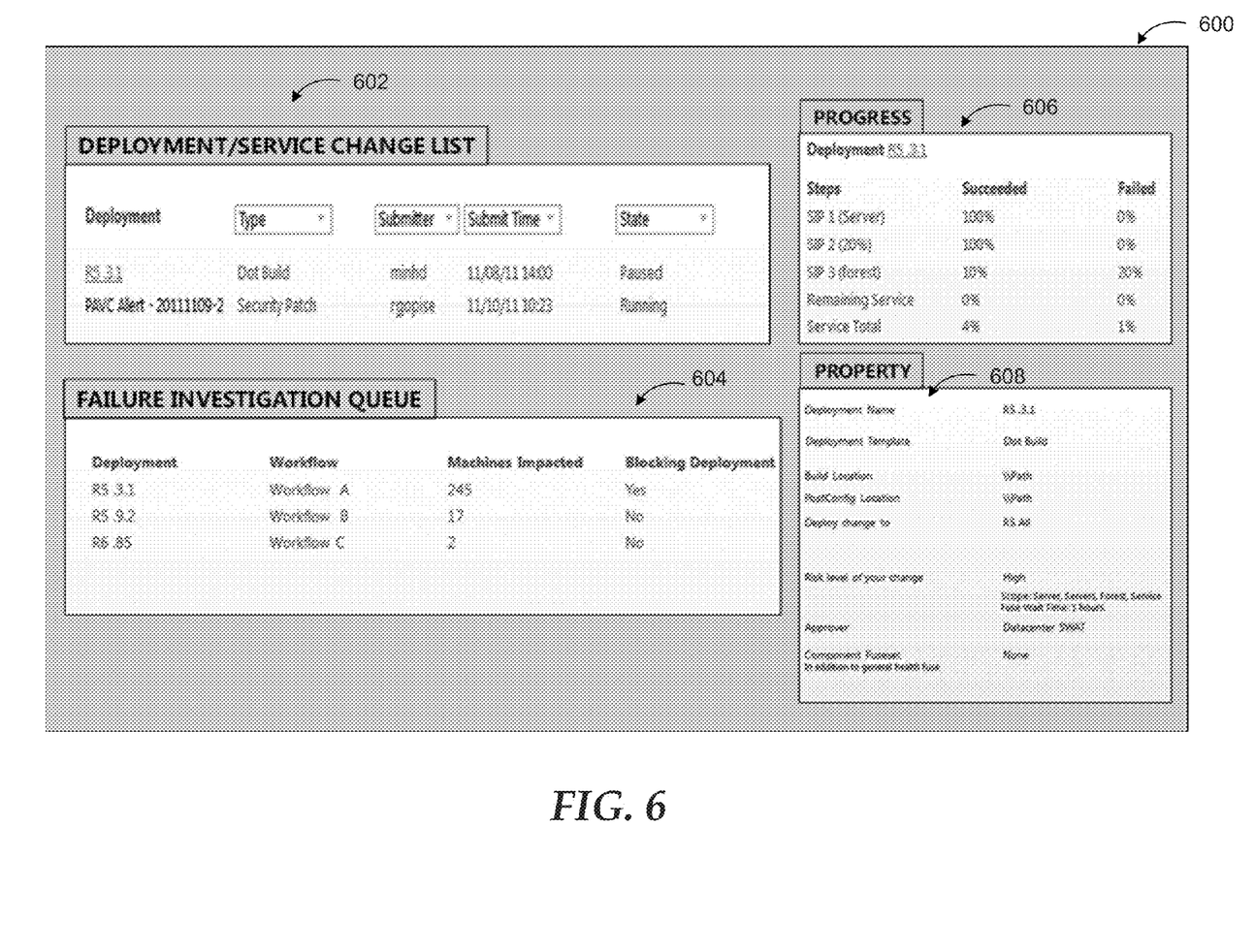
FIG. 6 illustrates an example orchestrator monitoring user interface, according to embodiments.

FIG. 6 illustrates an example orchestrator monitoring user interface, according to embodiments. The monitoring user interface may be utilized to provide information to users and administrators about the status of the change request, deployment, and validations. A deployment/service change list 602 may provide a list of open deployment projects. The list may provide the types of deployments, such as a full build and a patch, and provides information about who submitted the change request. A user may be able to view this information to view the state of the deployments by the orchestrator and to determine a good time to submit an additional change request.

A failure investigation in queue (FIQ) screen 604 may provide information about the workflow of each current deployment project. The workflow may impact a number of machines associated with the system, and in some cases, workflow impacting a machine can block deployment of the change request. The FIQ screen 604 may provide information about if certain machine workflows are blocking the deployment of the change request and enable administrators to troubleshoot machines using this information to enable the deployment to proceed.

A progress window 606 may provide information about the validation process at the validation component. As previously described, the validation component may be configured to evaluate the results of deployment for each of a series of deployment scopes. and to provide results of the deployment of the successful and failure servers to the orchestrator. The progress window may provide information about the validation at each validation point associated with deployment scopes, such as SDF, SIP1, SIP2, and SIP3. The orchestrator may provide a summary of the validation results at each point, such as the percentage of servers and mailboxes that succeeded or failed the change request. Additionally a property 608 window may provide information about a specific selected deployment, including the location of the data files, the target system of the deployment, the risk level, and the validation criteria.

Figure 7:
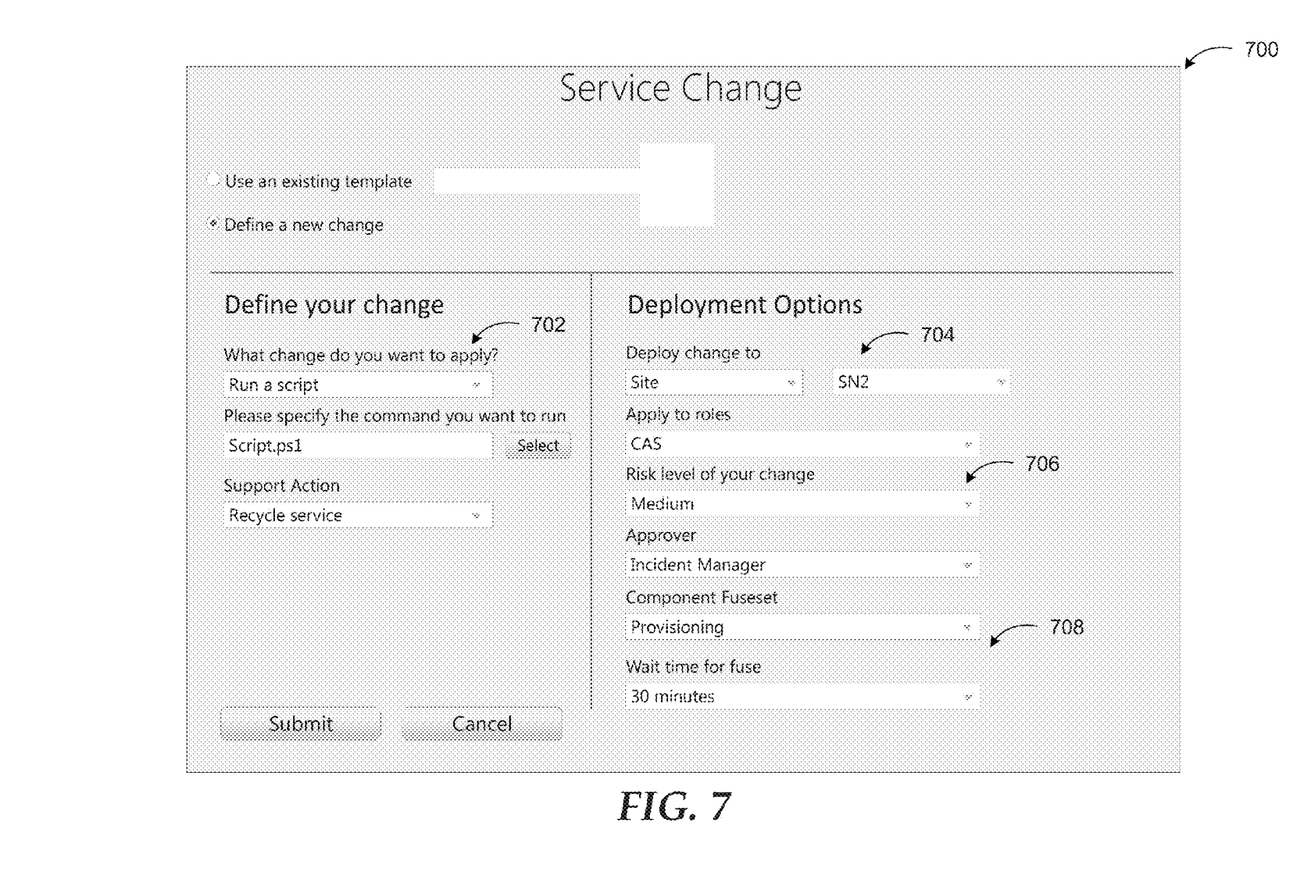
FIG. 7 illustrates an example user interface for selecting deployment options, according to embodiments.

FIG. 7 illustrates an example user interface for selecting deployment options, according to embodiments. The example user interface may enable a user to submit a change request and to provide information about the change request including commands and actions 702 that may be used to implement a change request. Additionally, a user may be able to specify deployment options for the change request, such as the target servers 704 or systems of the deployment, roles which the deployment is to be applied to, and a risk level 706 of the change.

Further, the user may specify validation criteria to be implemented by the validation component in validating each change request during the deployment process. When the change request is getting validated, the validation component may validate the general health of the change request, and may also validate the request in steps or stages, at particular points. Administrator can define the validation criteria 708 such as the stages of the validation or steps and when the validation is to occur.

FIG. 8 illustrates a deployment user interface for initiating a deployment request to an orchestrator, according to embodiments. When submitting a deployment request the submitting user or administrator may define deployment options to define how the deployment process is to proceed. An administrator may also be able to overwrite the selected options of a submitting user. A submitting user may select an existing patch 802 to apply to the system, and may select the target sites, servers, mailboxes, for example, that the orchestrator is to deploy the change request to. Additionally, the submitting user may specify the risk level of the change. The orchestrator may employ different deployment scopes depending on the risk level, and varying processing times to implement the change may be needed. The submitting user may also specify the time for validating the change request before proceeding with the deployment workflow.

The examples in FIG. 1-8 have been described with specific elements, configurations, and scenarios. Embodiments are not limited to systems according to these example configurations. Employing an orchestrator to deploy and implement changes to a system may be executed in configurations using other types of elements, scenarios, and configurations in a similar manner using the principles described herein.

Figure 9:
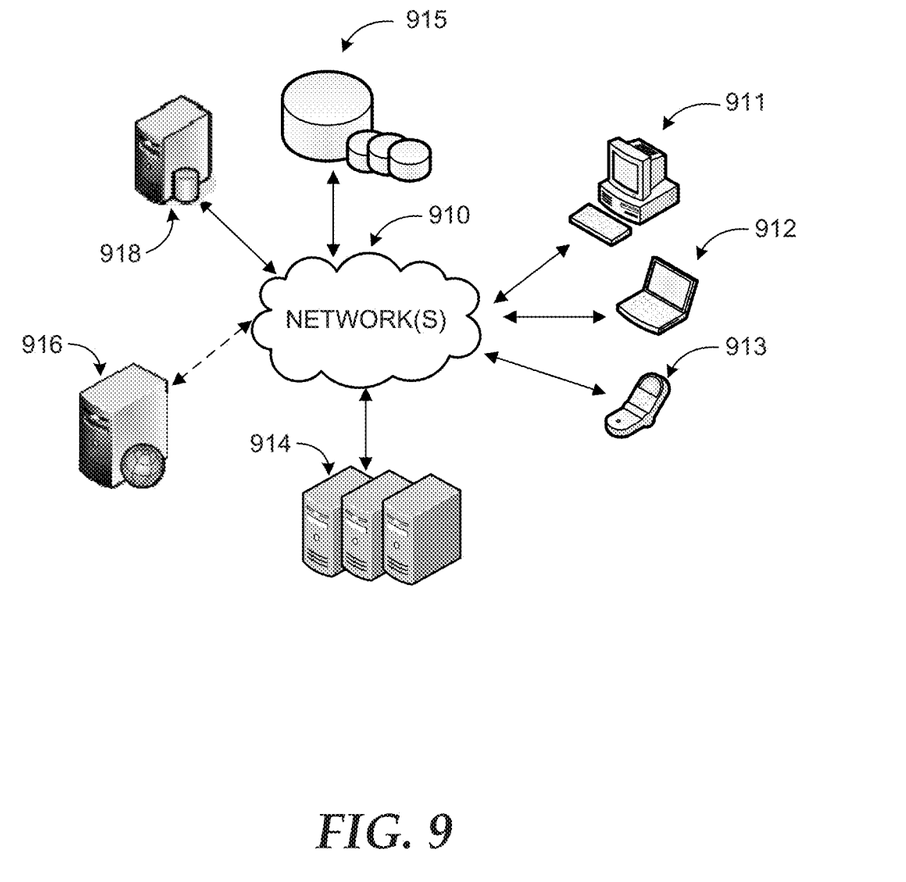
FIG. 9 is a networked environment, where an integrated system according to embodiments may be implemented.

FIG. 9 is an example networked environment, where embodiments may be implemented. A system employing an orchestrator to deploy and implement changes to a system may be implemented via software executed over one or more servers 916 such as a hosted service. The platform may communicate with client applications on individual computing devices such as a smart phone 913, a laptop computer 912, or desktop computer 911 ('client devices') through network(s) 910.

Client applications executed on any of the client devices 911-913 may facilitate communications via application(s) executed by servers 914, or on individual server 916. A change orchestrator application executed on one of the servers 914 or individual server 916 may enable change requests to be submitted to an orchestrator component and implemented at a target system. Through deployment scopes, the change orchestrator application may deploy changes to the target system through a series of deployment scopes, each one covering a progressively larger group for extensively testing change requests before implementation on the target system. The example system may retrieve relevant data from data store(s) 915 directly or through database server 918, and provide requested services to the user(s) through client devices 911-913.

Network(s) 910 may comprise any topology of servers, clients, Internet service providers, and communication media. A system according to embodiments may have a static or dynamic topology. Network(s) 910 may include secure networks such as an enterprise network, an unsecure network such as a wireless open network, or the Internet. Network(s) 910 may also coordinate communication over other networks such as Public Switched Telephone Network (PSTN) or cellular networks. Furthermore, network(s) 910 may include short range wireless networks such as Bluetooth or similar ones. Network(s) 910 provide communication between the nodes described herein. By way of example, and not limitation, network(s) 910 may include wireless media such as acoustic, RF, infrared and other wireless media.

Many other configurations of computing devices, applications, data sources, and data distribution systems may be employed to implement a platform providing an automated system upgrade orchestrator. Furthermore, the networked environments discussed in FIG. 9 are for illustration purposes only. Embodiments are not limited to the example applications, modules, or processes.

Figure 10:
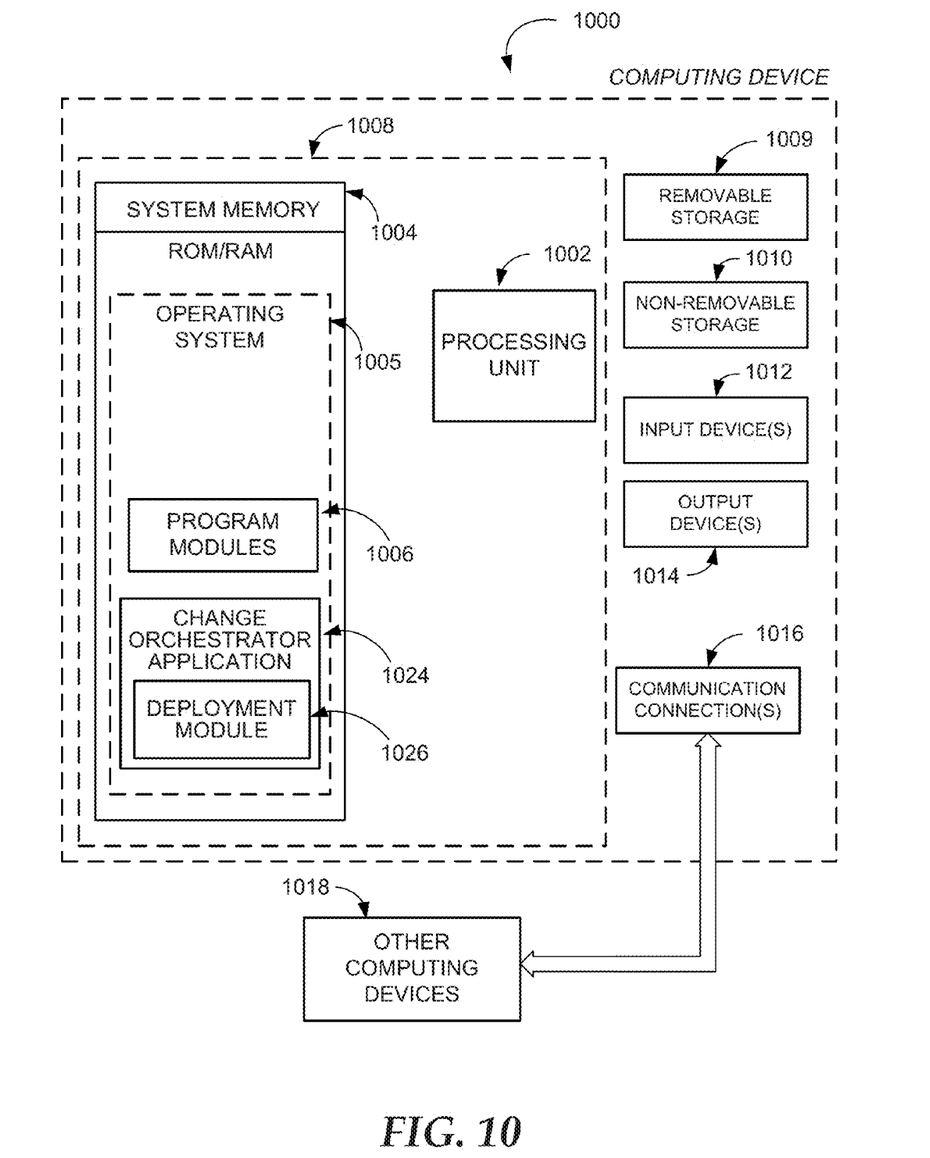
FIG. 10 is a block diagram of an example integrated system environment, where embodiments may be implemented.

FIG. 10 and the associated discussion are intended to provide a brief, general description of a suitable computing environment in which embodiments may be implemented. With reference to FIG. 10, a block diagram of an example computing operating environment for an application according to embodiments is illustrated, such as computing device 1000. In a basic configuration, computing device 1000 may be any computing device executing an application capable of employing an orchestrator to deploy and implement changes to a system according to embodiments and include at least one processing unit 1002 and system memory 1004. Computing device 1000 may also include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of the platform, such as the WINDOWS® operating systems from MICROSOFT CORPORATION of Redmond, Wash. The system memory 1004 may also include one or more software applications such as program modules 1006, change orchestrator application 1024, and deployment module 1026.

Change orchestrator application 1024 may enable change requests to be submitted to an orchestrator component and implemented at a target system. Through deployment scopes implemented by deployment module 1026, change orchestrator application 1024 may deploy changes to the target system through a series of deployment scopes, each one covering a progressively larger group for extensively testing change requests before implementation on the target system. The change orchestrator application 1024 may also employ a security component and a validation component for continuously performing security checks and validation checks on submitted change requests. Change orchestrator application 1024 and deployment module 1026 may be separate applications or integrated modules of a hosted service. This basic configuration is illustrated in FIG. 10 by those components within dashed line 1008.

Computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1016 and non-removable storage 1010. Computer readable storage media may include volatile and nonvolatile, removable and non-removable media implemented in any method or technology for storage of information, such as computer readable instructions, data structures, program modules, or other data. System memory 1004, removable storage 1016 and non-removable storage 1010 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 1000. Any such computer readable storage media may be part of computing device 1000. Computing device 1000 may also have input device(s) 1012 such as keyboard, mouse, pen, voice input device, touch input device, and comparable input devices. Output device(s) 1014 such as a display, speakers, printer, and other types of output devices may also be included. These devices are well known in the art and need not be discussed at length here.

Computing device 1000 may also contain communication connections 1016 that allow the device to communicate with other devices 1018, such as over a wired or wireless network in a distributed computing environment, a satellite link, a cellular link, a short range network, and comparable mechanisms. Other devices 1018 may include computer device(s)

that execute communication applications, web servers, and comparable devices. Communication connection(s) 1016 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
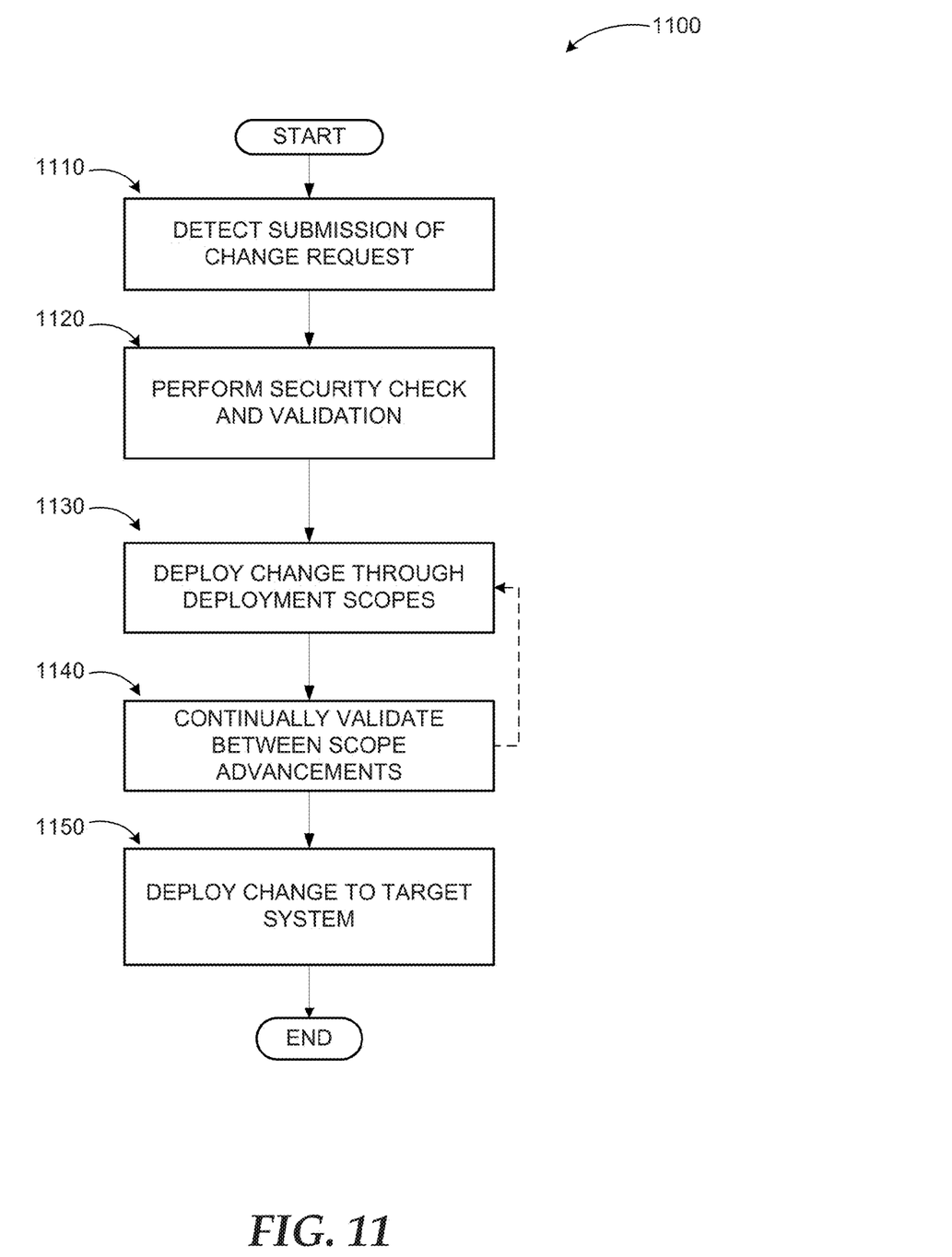
FIG. 11 illustrates a logic flow diagram for a process of deploying and implementing changes to a system, according to embodiments.

FIG. 11 illustrates a logic flow diagram for process 1100 of deploying and implementing changes to a system. Process 1100 may be implemented on a server or other computing device.

Process 1100 begins with operation 1110, where one or more change requests may be submitted to the orchestrator. A change request may be a full system build, system upgrades and a patch for updating a subset of files within the system. The change requests may initially be packaged such that the change request includes the information for successfully implementing the change requests to the system including data to be implemented or the payload, data configuration files, and data scripts. At operation 1120, the orchestrator may first perform a security check at a security component and initial validation at a validation component.

Upon receiving validation and approval, at operation 1130, the change request may be deployed and propagated through a series of deployment scopes. The deployment scopes may become increasingly larger in order to extensively test the applied change at a number of stages before fully implementing the change on the target system. Additionally, at operation 1140, after the change has been applied within a first deployment scope, the orchestrator may submit the applied change to the validation component for getting validation of the change within the deployment scope. The validation component may be employed after each applied change within a deployment scope. After the change request has been deployed through the series of deployment scopes and sufficiently validated, at operation 1150 the change request may be deployed to the target system and fully implemented.

The operations included in process 1100 are for illustration purposes. Employing an orchestrator to deploy and implement changes to a system may be executed by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for implementing changes to a system, the method comprising:
   receiving a change request at an orchestrator component;
   extracting from the received change request data configuration files, wherein extracting from the data configuration files information regarding a target system of a data payload, deployment scopes associated with the target system, and processing time for implementing the change request on the target system;
   performing a security check and a validation check, by hardware processor, to validate a quality of the change request and to ensure that the change request meets a specification of the target system, wherein a validation component performs the validation check in stages to validate several validation points, wherein prior to deploying the change request through an initial deployment scope, submitting the change request to the validation component for an initial validation to ensure that the target system is in a stable state for the deployment to begin;
   when the security check and the validity check are affirmed, deploying the change request through at least one deployment scope;
   deploying the change request to a target system; and
   implementing the change request on the target system.

2. The method of claim 1, further comprising:
   performing the security check on the change request at a security component to verify licenses and certificates associated with the received change request for the target system, and to ensure that deployment of the change request is within policy and request approval.

3. The method of claim 1, further comprising:
   when the validation component validates the change request at the initial validation, then deploying the change request to the initial deployment scope.

4. The method of claim 3, wherein the initial deployment scope includes a group of local servers on which the change request is initially applied.

5. The method of claim 4, further comprising:
   after deploying the change request to the initial deployment scope, re-submitting the change request to the validation component to evaluate a quality and success of the applied change request.

6. The method of claim 5, further comprising:
   when the validation component validates the applied change request in the initial deployment scope, then:
      deploying the change request to a series of progressively larger deployment scopes;
      applying the change request to a group of servers included within each deployment scope; and
      submitting the applied change request within each deployment scope to the validation component for receiving validation before deploying to a next larger deployment scope.

7. The method of claim 5, further comprising:
   when the validation component does not validate the applied change request within the deployment scope, then:
      suspending deployment of the applied change request to the next larger deployment scope; and
      providing results of the incomplete validation as a list of percentages of server failures and server successes.

8. The method of claim 1, further comprising:
extracting from the change request one or more of: a full system build, a partial system build, a configuration file patch, a system upgrade, a server upgrade, a binary patch, and a file patch.

9. A server for implementing changes to a system, comprising:
a memory for storing instructions;
a hardware processor coupled to the memory, the processor executing a change orchestrator application in conjunction with the instructions stored in the memory, wherein the change orchestrator application is configured to:
receive a change request at an orchestrator component;
extract from the received change request data configuration files, wherein information extracted from the data configuration files regards a target system of a data payload, deployment scopes associated with the target system, and process time for implementation of the change request on the target system;
perform a security check on the change request at a security component;
perform a validation check on the change request at a validation component to validate a quality of the change request and to ensure that the change request meets a specification of the target system, wherein the validation component performs the validation check in stages to validate several validation points, wherein prior to deployment of the change request through an initial deployment scope, the change request is submitted to the validation component for an initial validation to ensure that the target system is in a stable state for the deployment to begin;
when the security check and the validity check are affirmed, deploy the change request through a series of progressively larger deployment scopes;
deploy the change request to a target system; and
implement the change request on the target system.

10. The server of claim 9, wherein the change orchestrator application is further configured to identify a profile of the data payload, wherein the data payload includes one or more of: a risk level of the change request, target deployment scopes of the change request, approvals for the change request, validations for the change request, and a processing time for implementing the change request at the target system.

11. The server of claim 9, wherein the change orchestrator application is further configured to:
preview a final changed state of the target system based on one or more received change requests;
identify when any change requests are missing; and
when any change requests are missing, access a service data center to retrieve the missing change requests in order to implement the change requests to return the target system to the final changed state.

12. The server of claim 9, wherein the change orchestrator application is further configured to deploy the change request through a series of progressively larger deployment scopes, and wherein:
in an initial deployment scope the change request is applied to a group of local servers;
in a second deployment scope the change request is applied to one type of server in a role;
in a third deployment scope the change request is applied to a group of protocol servers; and
in a fourth deployment scope the change request is applied to a group of mailbox servers associated with the group of protocol servers.

13. The server of claim 9, wherein the change orchestrator application is further configured to provide a user interface for enabling a user to specify deployment options, including one or more of: a type of change request, a target system, a target deployment scope, a risk level, an urgency level, and validation criteria.

14. The server of claim 9, wherein when the validation component does not validate the change request, the change orchestrator application is further configured to:
suspend deployment of the applied change request to a next larger deployment scope;
generate an alert providing results of the incomplete validation as a list of percentages of server failures and server successes; and
perform an auto-recovery process to recover the target system with a backup copy of files maintained on the target system.

15. A computer-readable, non-signal, storage medium with instructions stored thereon for implementing changes to a system, the instructions comprising:
receiving a change request at an orchestrator component;
extracting from the received change request data configuration files, wherein extracting from the data configuration files information regarding a target system of a data payload, deployment scopes associated with the target system, and processing time for implementing the change request on the target system;
performing a security check on the change request at a security component;
performing a validation check on the change request at a validation component to validate a quality of the change request and to ensure that the change request meets a specification of the target system, wherein the validation component performs the validation check in stages to validate several validation points, wherein prior to deploying the change request through an initial deployment scope, submitting the change request to the validation component for an initial validation to ensure that the target system is in a stable state for the deployment to begin;
when the security check and the validity check are affirmed, deploying the change request through a series of progressively larger deployment scopes;
applying the change request to a group included within each progressively larger deployment scope;
validating the change request after applying the change request to the group included within each progressively larger deployment scope;
deploying the change request to a target system; and
implementing the change request on the target system.

16. The computer-readable, non-signal, medium of claim 15, wherein the instructions further comprise:
providing a deployment monitoring user interface displaying information about a status of the change request including one or more of: a list of open deployment projects, a workflow associated with each open deployment project, whether a workflow is blocking deployment of the change request at a server; progress of the validation at the validation component, validation results including successful and failure servers, a location of data payload files, the target system of the deployment, a risk level of the change request, and validation criteria.

* * * * *